April 8, 1924.

J. N. CARLSON 1,489,928

ANTISKID CHAIN FOR AUTOMOBILES

Filed July 14, 1922

INVENTOR.
JOHN N. CARLSON.
BY HIS ATTORNEY.
James F. Williamson

Patented Apr. 8, 1924.

1,489,928

UNITED STATES PATENT OFFICE.

JOHN N. CARLSON, OF STRANDBURG, SOUTH DAKOTA.

ANTISKID CHAIN FOR AUTOMOBILES.

Application filed July 14, 1922. Serial No. 574,996.

*To all whom it may concern:*

Be it known that I, JOHN N. CARLSON, a citizen of the United States, residing at Strandburg, in the county of Grant and State of South Dakota, have invented certain new and useful Improvements in Antiskid Chains for Automobiles; and I do hereby declare the following to be a full, clear, and exact description of the invention, such as will enable others skilled in the art to which it appertains to make and use the same.

This invention relates to a tire chain and particularly to such a chain having cross chains provided with anti-skid devices. The chain is adapted to be disposed on and secured around the tire and wheel of the automobile type.

It is an object of the invention to provide a tire chain having cross chains thereon, said cross chains being provided with anti-skid devices comprising ridged members, said members on the adjacent cross chains extending respectively transversely and longitudinally of the tire.

It is a further object of the invention to provide means preventing transverse movement of the chain, which means preferably comprise flexible members connected to the side chains and secured to the spokes of a wheel.

It is still another object of the invention to provide a novel securing means for attaching said flexible members to the spokes of the wheel.

These and other objects and advantages of the invention will fully appear from the following description made in connection with the accompanying drawings in which like reference characters refer to the same parts throughout the different views, and in which—

Figure 1:
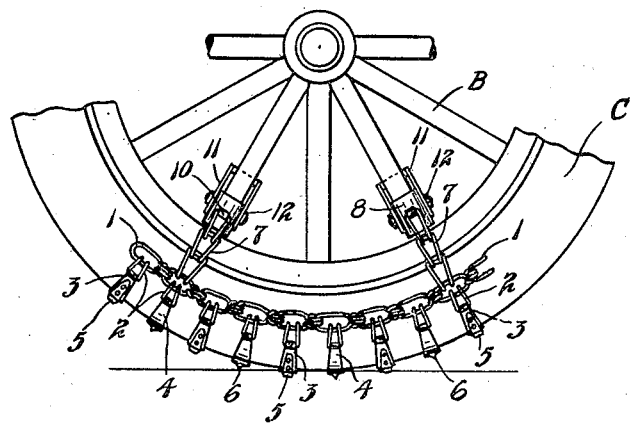
Fig. 1 is a view in side elevation of a portion of a tire-equipped wheel with the chain thereon.

Referring to the drawings, in Fig. 1 is shown a wheel of an automobile type comprising the spokes B and the tire C fitted on the rim thereof. The chain of the present invention comprises the side chains 1 of ordinary construction which are adapted to pass circumferentially around each side of the tire adjacent the rim of the wheel. Cross chains 2 have their end links connected to the links of the side chain and extend transversely across the tire. Connected in the cross chains substantially centrally thereof are curved plate members 3 and 4. These plate members are arcuate in shape and substantially fit the curvature of the tire and have riveted or otherwise suitably secured thereto on their outer surfaces additional plates. The plate 3 thus has the plate 5 secured thereto at its end portions, the central portion of said plate 5 being bent outwardly to form a substantially sharp ridge. As seen in Fig. 1, when the plate 3 is disposed on the tire, the edge or sharp portion of the ridge will extend longitudinally of the tire. The plate 4 has secured thereto substantially at its central portion the plate 6. The latter plate is riveted to the plate 4 adjacent its side edges and has its central portion bent outwardly to form a substantial sharp ridge. Also as shown in Fig. 1, when plate 4 is disposed on a tire the edge or sharp portion of the ridge 6 will extend transversely of the tire.

In order to prevent lateral movement of the chain on the tire, certain of the links of the side chain 1 are connected by flexible members or chains 7 to the spokes B. For this purpose, spoke clamping means is provided comprising semi-cylindrical half sleeves 8 and 9, each of which is provided with a projecting apertured lug 10 adapted to receive the inner end link of the chain 7. Pivoted at each side of the half sleeve 9 adjacent its edges and intermediate the length thereof are levers 11, which levers are preferably formed of one piece or have their inner ends connected by a curved portion fitting around the spoke, thus forming a bail. The outer ends of the lever 11 or of the bail formed thereby are curved outwardly from their pivotal connection with the half sleeve 9, said curved portions extending away from the half sleeve 8 and being disposed in planes substantially normal to the plane of the wheel. To the ends of these curved portions are pivoted hook links 12, the hooked ends of which are adapted to engage projecting pins 13 on the half sleeve 8.

A lining member 14 of felt, rubber or some similar material is provided preferably formed in halves to fit around the spoke B.

Figure 5:
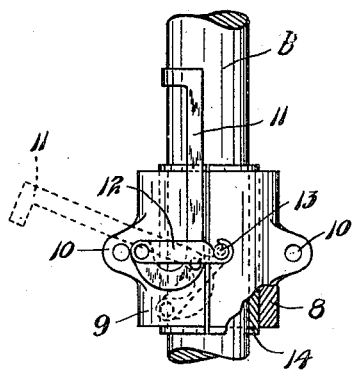
Fig. 5 is a view in elevation partly in section of the spoke clamping means, Figs. 2 to 5 being on an enlarged scale.
Figure 2:
Fig. 2 is an edge view of one of the anti-skid devices.
Figure 3:
Fig. 3 is a similar view of one of the other anti-skid devices.
Figure 4:
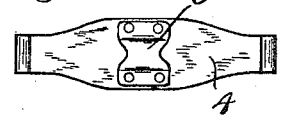
Fig. 4 is a bottom plan view of the device shown in Fig. 3.

With the described construction the chain will be placed around the tire and the half sleeves 8 and 9 applied to the spokes. The levers 11 will be swung substantially to the dotted line position shown in Fig. 5. At this time, the half sleeves 8 and 9 will be loosely engaged on the spokes and can be moved inward thereof to draw the tire chain and the chain 7 into taut position about the tire. When the half sleeves 8 and 9 have thus been moved the levers 11 will be swung into position substantially parallel with and extending along the spokes B, as shown in full lines in Fig. 5. The eccentric action of the curved ends of the levers will thus cause the links 12 to draw the half sleeves together to tightly clamp the spoke and the chain will thus be held in proper position on the tire. The plates 5 on members 3 effectively prevent side skidding of the wheels. It is the tendency of these plates to dislocate the chain on the tire that necessitates the provision of the holding chains 7. The plates 6 will securely bite on the ground or traveling surface in the rotation of the wheels. The chain thus not only provides the desired traction effect but efficiently prevents side slipping or skidding of the wheels. The side chains may be provided with the usual connecting hooks now commonly used but which are not illustrated.

From the above description it is seen that applicant has provided a very simple and efficient tire chain. The parts can be easily and inexpensively made and can readily be made sufficiently rugged for any kind of rim. By the provision of the spoke clamping means the chain can be readily attached and detached from the wheel when desired.

It will, of course, be understood that various changes may be made in the form, details and arrangement of the parts without departing from the scope of applicant's invention, which, generally stated, consists in the matter shown and described and set forth in the appended claims.

What is claimed is:

1. A tire chain comprising side chains and cross chains, certain of the latter provided with arcuate plates having ridges thereon extending longitudinally of the tire, and means secured to the side chains to prevent transverse movement thereof and of the cross chains.

2. A clamping means adapted to secure a tire chain to the spokes of a wheel comprising, a pair of half sleeves adapted to embrace the spoke of said wheel, each provided with an attaching means for the end of a chain, and an eccentric lever therefor having links at its ends for drawing the half sleeves together about the spoke, said lever and links being connected, respectively, to each of said half sleeves.

3. A clamping means for a tire chain comprising a pair of substantially semi-cylindrical half sleeves adapted to embrace the spoke of a wheel, each provided with an attaching means for a chain link, a bail member having its cross member curved to extend around the spoke and having its arms pivoted adjacent their ends to one of said half sleeves and having curved end portions projecting away from the other half sleeve, and links pivoted at one end to said curved end portions and being provided with hooks at their other ends adapted to engage pins projecting from the other half sleeve whereby when said bail is swung with its arms extending along the spoke and its cross member adjacent the spoke the half sleeves will be clamped to said spoke.

4. A clamping means for securing a tire chain to the spoke of a wheel comprising, a pair of substantially semi-cylindrical half sleeves adapted to embrace said spoke, a lever at each side of one of said half sleeves pivoted thereto adjacent their ends and having curved ends extending parallel and substantially in a plane normal to the plane of the wheel, hooked links pivoted to said ends adapted to engage pins projecting from the other half sleeve whereby when said levers are swung into parallel position to the spoke the half sleeves will be clamped to the spoke.

In testimony whereof I affix my signature.

JOHN N. CARLSON.